Aug. 11, 1942.     L. G. COPEMAN     2,292,614
COLLAPSIBLE BIRD HOUSE
Filed March 24, 1938     2 Sheets-Sheet 1
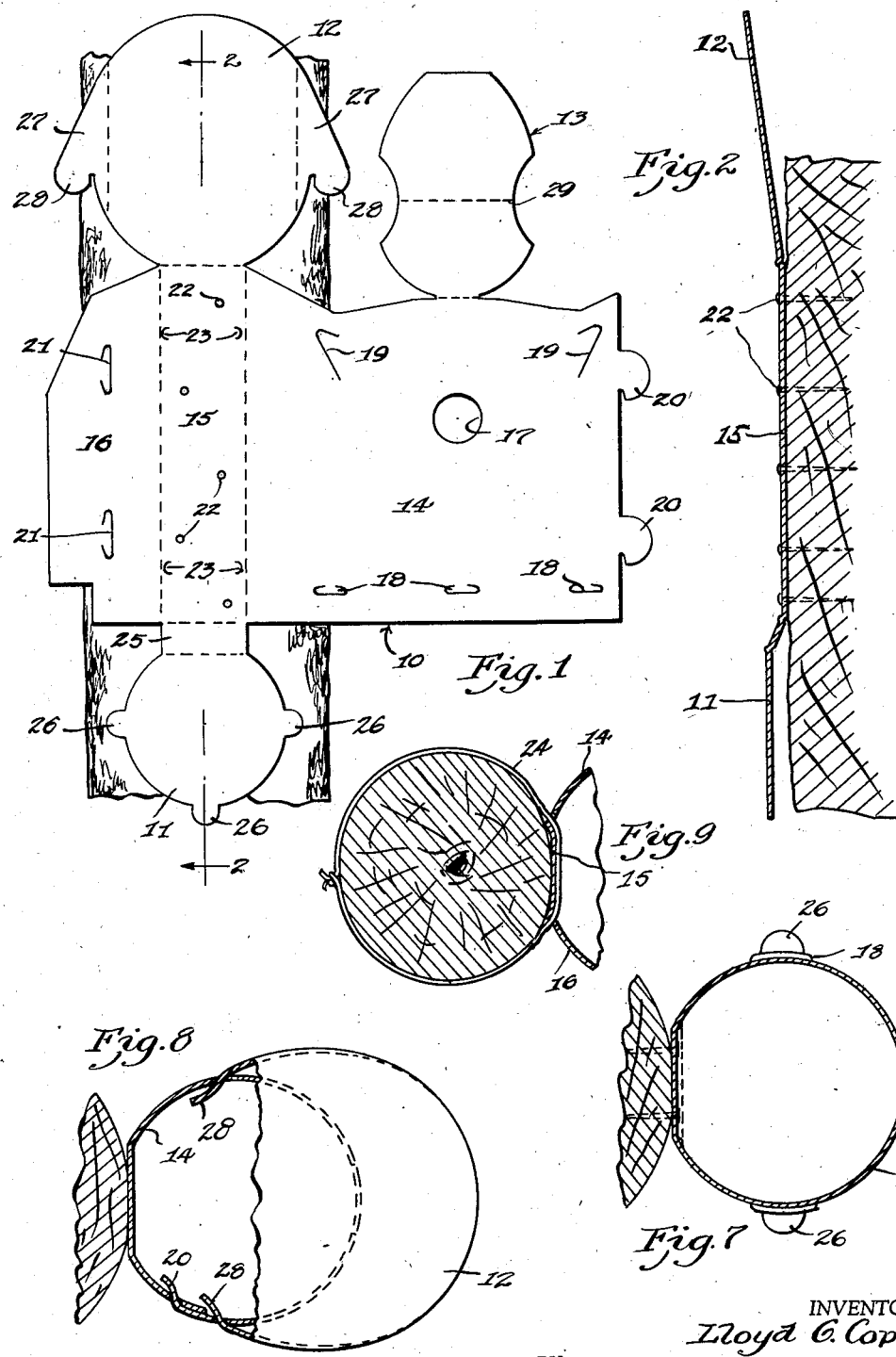
INVENTOR.
Lloyd G. Copeman
BY
Barnes, Kisselle, Laughlin & Raisch
ATTORNEYS Aug. 11, 1942.  L. G. COPEMAN  2,292,614
COLLAPSIBLE BIRD HOUSE
Filed March 24, 1938  2 Sheets-Sheet 2

INVENTOR.
Lloyd G. Copeman
BY
Barnes, Kisselle, Laughlin & Raisch
ATTORNEYS

Patented Aug. 11, 1942

2,292,614

UNITED STATES PATENT OFFICE 2,292,614

COLLAPSIBLE BIRD HOUSE

Lloyd G. Copeman, Flint, Mich.

Application March 24, 1938, Serial No. 197,826

2 Claims. (Cl. 119—23)

This invention relates to improvements in collapsible bird houses.

More particularly this invention relates to a blank for a bird house of the type formed of a single sheet of cardboard or paper. These one-piece bird houses are usually fastened in assembled relation by detachable fasteners or split rivets. There is difficulty, however, in fastening the house together since, when one end is closed, it is impossible to get inside the other end to split or open the fastening rivets.

An object of the present invention is to provide a blank for a bird house of the one-piece type which has several distinct advantages as far as concerns the means for fastening the house in assembled relation.

Another object of the invention has to do with a novel reinforcing and insulating arrangement which serves to strengthen the assembled structure considerably.

Other objects and features of the invention have to do with details of construction and design as will be set forth in the following description and claims.

In the drawings:

Fig. 1 is a plan view of the blank of the bird house cut to provide the walls, roof and floor and the fastening tabs of the improved bird house.

Fig. 2 is a section on the lines 2—2 of Fig. 1.

Fig. 7 is a section taken on the lines 7—7 of Fig. 4.

Figure 3:
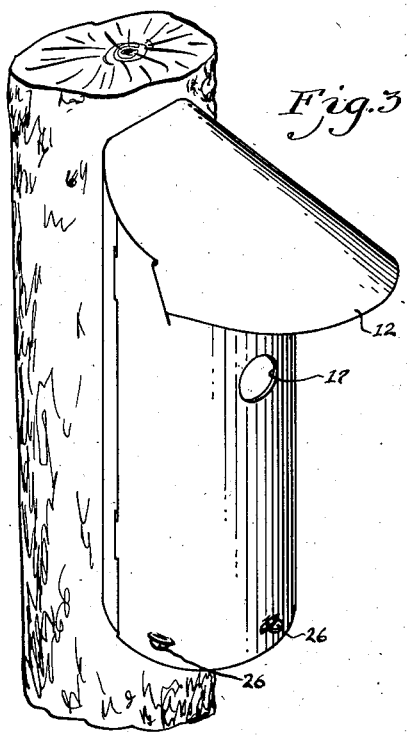
Fig. 3 shows the assembled bird house fastened to a trunk or limb of a tree.
Figure 4:
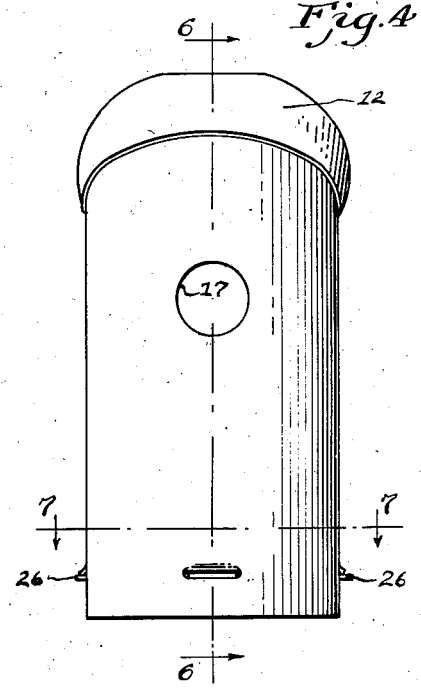
Fig. 4 is a front view of the bird house.
Figure 5:
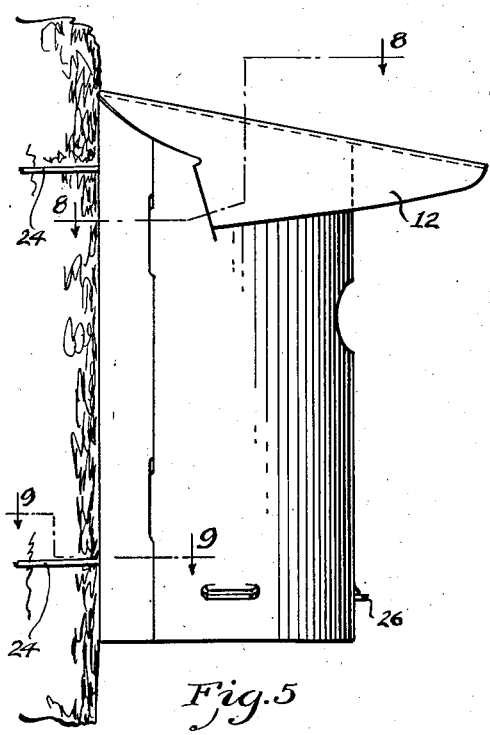
Fig. 5 is a side view of the assembled house.

Figs. 8 and 9 are sections taken on the lines 8—8 and 9—9 of Fig. 5.

While the type of bird house contemplated by the present invention is adapted for general use, it is particularly useful in orchards or woods where the owner desires to have a considerable number of bird houses distributed through the trees. Under these circumstances it will be seen that it is desirable to have a collapsible bird house which is in a one-piece blank and which needs no separate fastening means. With such a house, a person distributing the houses may set out with simply a bunch of blanks, and be unencumbered by the need for rivets, screw eyes, hammers, or other tools usually necessary in the assembling of a bird house.

Referring to the drawings, the bird house blank, shown in Fig. 1, is composed of a body portion 10, a floor portion 11, a roof portion 12 and a reinforcing portion 13. The blank is preferably formed of waterproof paper or cardboard.

The body portion 10 consists essentially of three portions, a main portion 14, a back 15 and a supplementary side portion 16. The main portion 14 is provided with an entrance hole 17. Adjacent the lower edge of the main portion 14, but spaced therefrom, are slots or openings 18. Above and on each side of the hole 17 are slots 19. These slots 18 and 19 are adapted to receive fastening tabs as will later be described. The right edge of the body portion 10 is provided with fastening tabs 20 which are adapted to pass through and fasten in slots 21 found in the supplementary portion 16 of the main body portion.

The back portion 15 is adapted to support the bird house. It may be nailed to a post or tree by nails 22 as shown in Fig. 1, or it may be provided with opposed slots or holes 23 through which will pass a weather-resisting and insect-proof cord 24 which will be tied around the supporting member, as shown in Fig. 9.

The bottom portion 11 of the bird house is substantially circular in shape and is connected to the back portion 15 of the body of the house by a narrowed strip 25. The edges of the bottom portion 11 are provided with tabs 26 which are adapted to register with and pass through the slots 18 in the portion 15 of the body of the house.

The roof portion of the house is shaped as shown in Fig. 1 so that it will overhang the front portion of the house when assembled. On this roof portion 12 are side pieces 27 which are adapted to fold down and on which are formed tab portions 28 which will register with the slots 19 of the body portion.

The reinforcing tab 13 may have a number of shapes but the preferred design is shown in Fig. 1 wherein the tab 13 is folded at 29 and the tab is designed in such a manner that it would form a reinforcement for the walls of the body portion.

Figure 6:
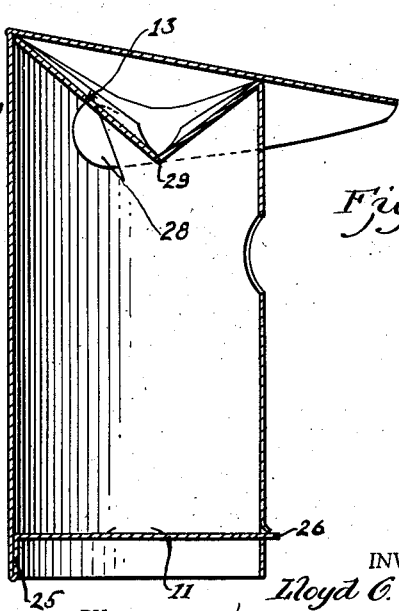
Fig. 6 is a section on the line 6—6 of Fig. 4.

In assembling the bird house the portion 25 connecting the floor and the back portion is folded up parallel with the back portion and the portion 14 of the body is curved around the floor portion, the tabs 26 being inserted through their respective slots 18. The tabs 20 are then passed through the slots 21 in the supplementary side portion 16 and the reinforcing piece 13 is folded down into the tubular body as shown in Fig. 6. The roof 12 is then folded down over the open end of the tubular body and the side portions 27 are bent down so that the tabs 28 may be inserted through the slots 19.

If the houses are to be fastened to their supports by nails, the nails may be driven through the back 15 into the support before the house is assembled. The blank is then mounted as shown in Fig. 1, and can be assembled as above described. If the tying cord 24 is to be used to support the house it may be tied around the supporting member either before or after the house is assembled.

If the bird house is to be used in an orchard it is desirable that no nails be driven into the trees to damage the bark. In this case it is desirable to use the flexible tying cords 24. It will be seen that in hanging a number of these houses in an orchard, that no hammer or other tools would be necesary. The orchardist could carry a bunch of houses under his arm and proceed to the selected spots to hang the houses, assembling each one as he mounts it in its desired position.

By fastening the floor 11 to the body portion by means of the narrow strip 25 it will be seen that the floor will, when assembled, be spaced from the lower edge of the body portion of the house. With this arrangement the house receives considerably more reinforcement than if the floor portion is exactly adjacent the lower edge of the body portion. Reinforcement is also obtained from the member 13 which contacts the walls of the body portion and maintains them in a cylindrical or tubular position. The reinforcing portion 13 has an added advantage of forming an insulating chamber in the top of the house which protects the interior of the house from the heat of the sun and makes it more nearly aproximate a hollow portion of a tree.

What I claim is:

1. A bird house blank of the one-piece type formed from a single sheet of paper comprising, a back portion, top and bottom portions formed at either end of the back portion and body forming portions on each side of said back portion, having interfitting fastening means formed integrally from said single sheet of paper whereby when the back member has been fastened to a support the top, bottom and body portions may be completely assembled to form a bird house with a tubular body, without the use of separate fastening means, by interfitting the integral fastening means of the adjacent portions and a reinforcing portion formed on the upper edge of one of said body forming portions and adapted to impart lateral strength to the assembled body forming portions.

2. A bird house blank of the type formed from a single sheet of paper, comprising a normally flat body portion adapted to be folded to form a tubular body of the bird house, a bottom portion extending integrally from a part of the body portion, a top portion extending integrally from an opposite edge of the body portion, and a single sheet reinforcing portion extending integrally from the body portion and adapted when the body portion is folded to lie underneath the top portion with two portions disposed at an angle to reinforce the body portion.

LLOYD G. COPEMAN.